A. D. MARTIN.
Evaporating Pan.

No. 204,745. Patented June 11, 1878.

WITNESSES:
Henry N. Miller
C. Sedgwick

INVENTOR:
A. D. Martin
BY Munn & Co
ATTORNEYS.

UNITED STATES PATENT OFFICE.

ANDREW D. MARTIN, OF ABBEVILLE, LOUISIANA.

IMPROVEMENT IN EVAPORATING-PANS.

Specification forming part of Letters Patent No. 204,745, dated June 11, 1878; application filed March 20, 1878.

*To all whom it may concern:*

Figure 1:
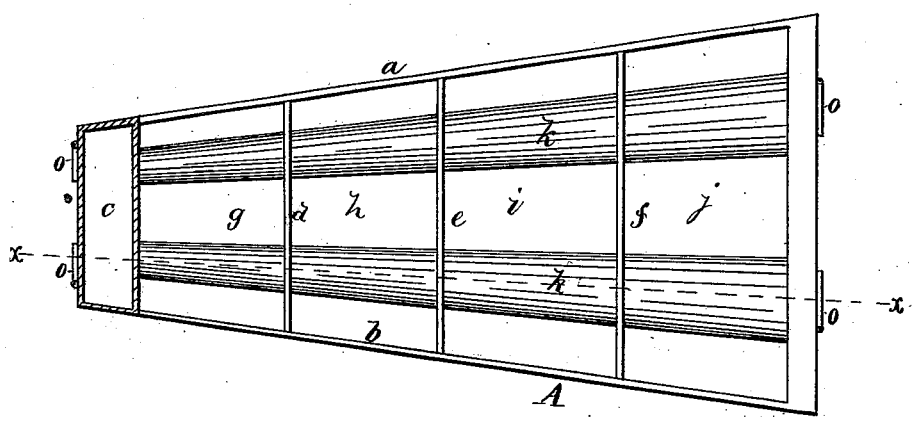
Figure 2:
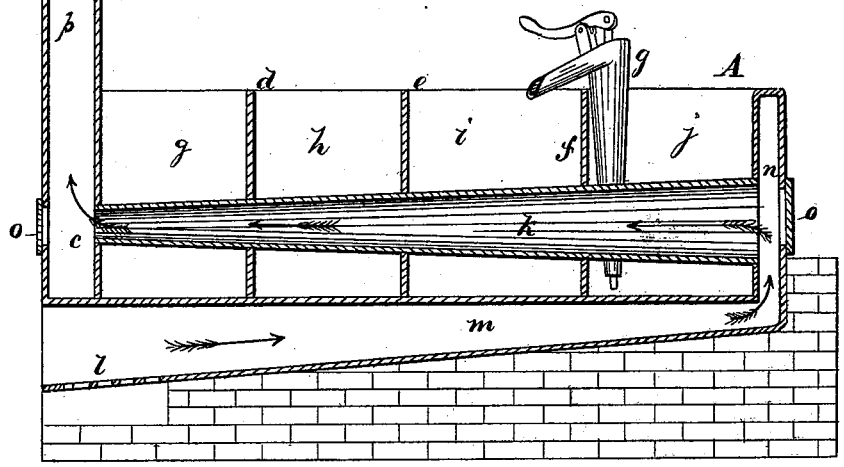

Be it known that I, ANDREW D. MARTIN, of Abbeville, in the parish of Vermillion and State of Louisiana, have invented a new and Improved Sugar-Evaporator, of which the following is a specification:

Figure 1 is a plan view, partly in section, of my improved sugar-evaporator. Fig. 2 is a longitudinal section taken on line $x\ x$ in Fig. 1.

Similar letters of reference indicate corresponding parts.

My invention consists in a tapering sheet-metal tank having transverse partitions and longitudinal tapering flues that extend through all of the partitions and terminate at the ends of the tank.

The said tank is set in brick-work, in which there is a fire-box, and a smoke stack is provided for carrying away the smoke.

Referring to the drawing, A is a tank made of sheet-iron or other suitable material, and having sides $a\ b$, which converge toward a smoke-box, $c$, formed in the smaller end of the tank. The upper and lower edges of the sides are parallel, so that the tank is of one depth throughout its entire length.

The tank is divided transversely by partitions $d\ e\ f$, forming compartments $g\ h\ i\ j$, for receiving the juice of the sugar-cane.

Two tapering flues, $k\ k$, extend from the wider end of the tank through the several partitions and compartments to the smoke-box $c$. The tank is set in brick-work, in which there is a grate, $l$, and a flue, $m$, which leads to the larger end of the tank, and communicates with the flues $k$ by means of a smoke-box, $n$, formed on the larger end of the tank. In the smoke-box $c$, and also in the smoke-box $n$, there are openings $o$, directly opposite the ends of the tapering flues $k$.

A smoke-stack, $p$, is connected with the smoke-box $c$, for conducting away the products of combustion.

The juice to be evaporated is placed first in the compartment $j$, and, after boiling for a time, is removed to the compartment $i$ by means of the pump $q$. After it becomes further evaporated in the compartment $i$ it is pumped into the compartment $h$, and from this compartment to the compartment $g$, where the process of concentrating the juice is carried as far as it is possible to carry it in open vessels.

I am aware that it is not new in evaporating-pans to use liquid-compartments and traversing-flues with a furnace; but my flues have a larger heating-surface in the larger compartments, the latter diminishing in size as they approach the smoke-pipe. The different sizes of compartment or kettle are very essential in sugar-boiling, the larger gradually preparing the juice for the smaller, where it is boiled to sugar without the admixture of any raw juice, thus producing a very fine and clean sugar.

What I claim as new and of my invention is—

An evaporating-pan for the manufacture of sugar, divided into separate compartments $g\ h\ i\ j$, gradually increasing in size from the smoke-pipe $c$ to the smoke-box $n$, said pipe being connected with the box by tapering flues $k$, passing through the compartments and the box with the furnace by a flue, $m$, under the compartments, as shown and described.

A. D. MARTIN.

Witnesses:
W. W. EDWARDS,
LUCIUS NEVEN.